May 12, 1959  R. E. KRUKOWSKI  2,886,624
BATTERY CASE FILLING PLUG AND LIQUID LEVEL INDICATOR
Filed Sept. 16, 1957
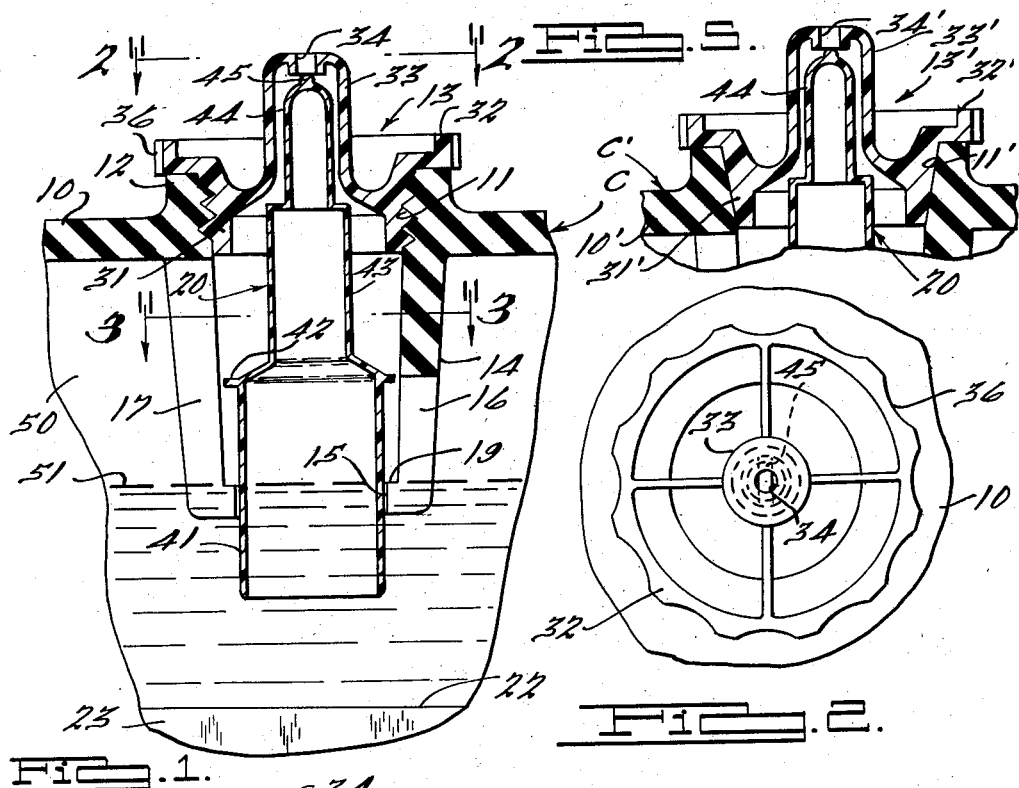
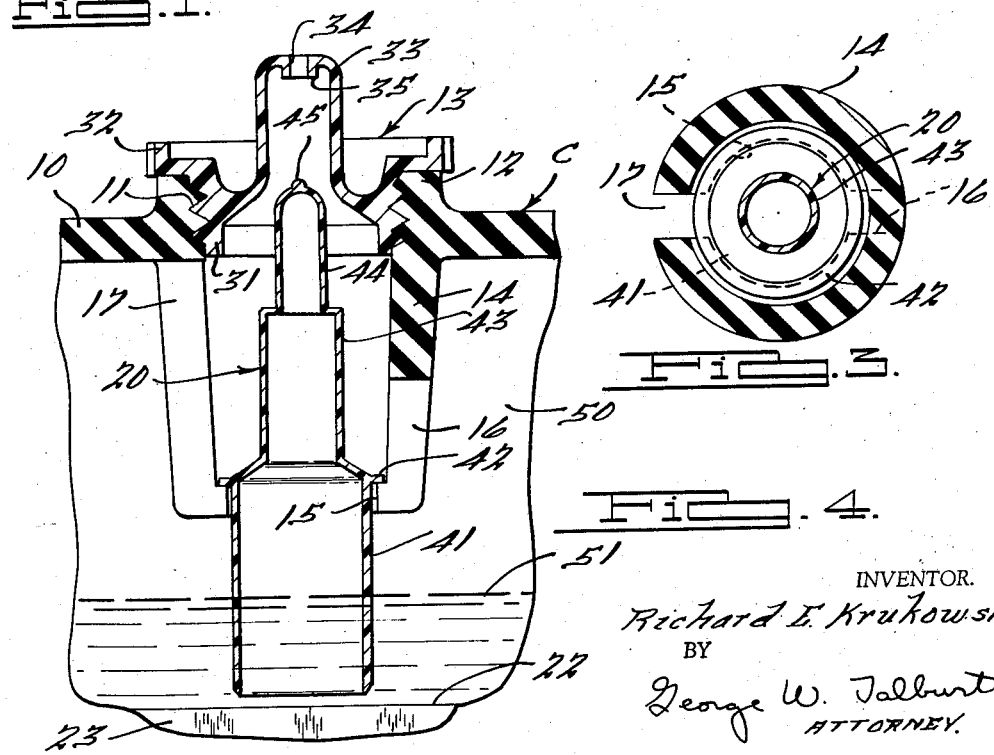
INVENTOR.
Richard E. Krukowski
BY
George W. Talburtt
ATTORNEY.

2,886,624
Patented May 12, 1959

2,886,624
BATTERY CASE FILLING PLUG AND LIQUID LEVEL INDICATOR

Richard E. Krukowski, Detroit, Mich., assignor to Leed Research Company, Detroit, Mich.

Application September 16, 1957, Serial No. 684,093

2 Claims. (Cl. 136—177)

This invention relates to a combination battery case filler plug and electrolyte level indicator.

It is a primary object of this invention to provide a simplified type of combination filler plug and liquid level indicator for battery cases, or the like, which device can be readily applied to current battery case constructions to give an improved battery unit.

It is still another object of this invention to provide a combination battery case filling plug and liquid level indicator that is composed of only two separate pieces and wherein the level indicator is not removed from the battery case when the filling plug is removed to permit the addition of water or other liquid to the interior of the battery case.

It is still another object of this invention to provide a simplified form of two-piece combination battery case filling plug and liquid level indicator wherein the level indicator element normally remains in the battery case when liquid is added to the case through the opening provided by removal of the plug but wherein the level indicator may be readily removed from the plug opening if it should interfere in any way with the use of instruments such as a hydrometer or the like to check the condition of the battery cells.

It is a further object of this invention to provide a two-piece combination battery case filling plug and electrolyte level indicator wherein the level indicator is a simplified form of hollow tubular float having radial projections thereon that engage projections on the inner side of the battery case to seat the float in its lowermost "fill" position.

It is still another object of this invention to provide a simplified form of two-piece, telescopically arranged, battery case filling plug and liquid level indicator wherein the plug and level indicator elements have cooperating fluid baffle and gas bleed portions that prevent the loss of electrolyte but permit the elimination of gases that may be formed within the battery case.

It is still another object of this invention to provide a pair of tubular, telescopically arranged, plug and float elements that may be readily associated with a conventional battery case fill opening to permit a ready exterior check of the electrolyte level within the battery.

Other objects and advantages of this invention will become readily apparent from a reading of the following description and a consideration of the related drawings wherein:

Fig. 1 is a fragmentary sectional elevational view of a portion of a battery case showing the combination filling plug and liquid level indicator embodying this invention applied thereto, the indicator showing the level to be at "full" position;

Fig. 2 is a plan elevational view looking in the direction of the arrows 2—2 of Fig. 1;

Fig. 3 is a sectional elevational view taken along line 3—3 of Fig. 1;

Fig. 4 is a sectional elevational view similar to Fig. 1 but showing the level indicator in "add" or "fill" position; and Fig. 5 is a fragmentary sectional elevational view of a modified form of filling plug embodying this invention.

In Fig. 1 there is shown the top portion of a wet cell or storage battery wherein 10 represents the top wall of the battery case C. The top wall 10 of the case C includes one or more liquid filling openings 11 through which water and/or other liquids such as acid or the like may be periodically added to the battery case interior. The fill opening 11 in the top wall 10 of the case C is preferably threaded as shown in Figs. 1 and 4 although it can be unthreaded as shown in Fig. 5. Opening 11 in the case C shown is defined by a raised collar formation 12. Collar 12 provides a seat to receive the threaded plug cap 13 that will be hereafter described in detail. The battery case filler opening 11 has a depending, substantially cup-like, formation 14 aligned therewith and positioned interiorly of the case top wall 10. The depending cup-like formation 14 has an opening 15 in its bottom wall and its side walls are slotted as shown at 16 and 17. The opening 15 in the bottom wall of the depending cup-like formation 14 is of such a size that a radially inwardly extending flange 19 is provided which serves as a seat for the hollow float level indicator 20 that will subsequently be described. The slots 16 and 17 in the side walls of the cup-like depending case formation 14 provide apertures through which liquid may readily flow during filling of the battery case interior. Gases that are generated within the battery case may also pass through the slots 16 and 17 and escape as will be hereinafter more fully described. It will be noted that the bottom wall 15 of the depending cup-like formation 14 is positioned well above the top edge 22 of the battery plate element 23. The battery case top wall 10 with its threaded fill opening 11 and the slotted, depending, cup-like structure 14 may be considered to be conventional battery case structure that is old in the art and with which the invention to be hereafter described is intended to be associated.

This invention comprises the two-piece battery case fill plug 13 and associated float-type liquid level indicator 20. The plug 13 is formed from some clear, transparent, acid resistant material such as polystyrene, glass, or the like. Plug 13 has a tubular hub portion 31 that has threads on its outer peripheral surface that will matchingly engage the threads on the sides of the fill opening 11 in the case top wall 10. The hub 31 terminates at its upper end in a outwardly extending radial flange portion 32 that is adapted to seat on the top of the collar 12 of the case top wall 10. Extending upwardly from the inside of the plug hollow hub portion 31 is a hollow tubular tower 33. The top of the tower 33 is pierced by a gas bleed opening 34. The inside or lower edge 35 of the bleed opening 34 is projected downwardly to form a baffle portion to prevent the fluid that might slosh around on the inside of the tower 33 from being thrown out through the opening 34. The downwardly extending rim 35 around the lower edge of the plug tower opening 34 also provides a seat for limiting the upward movement of the liquid level indicator float 20. The outer edge of the hub portion flange 32 can be scalloped, or knurled, as at 36, to provide a good gripping surface.

The liquid level float indicator 20, that is reciprocably mounted within the depending cup-like portion 14 of the battery case top wall 10, is preferably formed of some opaque bright colored, acid resistant, lightweight material such as red polystyrene. Float 20 is essentially a three step upwardly tapering, hollow, upper end, tube. The base or lowermost tubular portion 41 has an open lower end and an outwardly projecting flange portion 42 at its upper end that is adapted to seat on the flange portion 15 of the case depending cup 14, as clearly shown in Fig. 4. The intermediate or middle portion 43 of the float 20 has its lower end connected to the top of base portion 41 and its upper end connected to the top portion 44. The top end of the top portion 44 is closed and is formed with an upwardly projecting exterior rib 45. Rib 45 on tower portion 44 cooperates with the downwardly extending rim 35 around the opening 34 in the plug tower portion 33 to seat the float 20 in its uppermost or battery cell "full" position (see Fig. 1). Engaged portions 35, 45 also act as a baffle to reduce loss of fluid from the plug tower portion 33 due to sloshing.

From the foregoing it is thought to be obvious that the two-piece combination filler plug and liquid level float indicator 13, 20 is a very simple, yet practical and advantageous improvement, that can readily be incorporated in any present or future battery case construction. This clear plastic plug 13 with its colored, interiorly arranged, float 20 provides a signal means that readily permits a service attendant to visibly determine at a glance, without removing the plug 13, whether any of the battery cells should have water added thereto. Secondly, it is not necessary to remove the level indicator if water should be required. All that is necessary to accomplish addition of liquid to a battery cell is removal of the plug 13 in the normal fashion and thereafter water can be poured into the case opening 11 where it will readily flow down into the case interior 50 through the slots 16, 17. By not having to remove the float 20, when water is to be added to the battery, the danger of dripping an acid solution on the service attendant or any adjacent material is eliminated.

From Fig. 1, it will be noted that the battery cell "full" condition when the liquid upper level 51 is at a safe position, is visibly indicated without removing plug 13 because the red upper tower portion 44 of the float 20 is positioned in the top of the transparent tower portion 33 of the plug 13. When the float 20 indicates that water needs to be added to the battery cell, as shown by Fig. 4, then the liquid level 51 has dropped to an "add" or "fill" position and the float top portion 44 is now withdrawn from the tower 33 in the plug 13. In the position shown in Fig. 4 the float is seated on the battery case portion 15 by means of the flange 42. It is thought to be clear that with any position of the float 20 the gases formed within the battery case C can pass from the interior space 50 through slots 16, 17 and up into tower 33 where they can escape through opening 34 in the plug 13.

Fig. 5 shows a plug 13' that is not threaded but has its hub portion 31' tapered to frictionally fit the tapered, smooth bored, fill opening 11' in the case top wall 10'. All other portions of the structure shown in Fig. 5 are identical to what is shown in Figs. 1–4.

I claim:

1. A two-piece battery case fill plug and liquid level indicator comprising independent plug and float members, said plug member including a cylindrical, hollow body portion adapted to be releasably secured in the cell fill opening, said plug body portion having an upwardly extending, transparent, tubular central tower, the upper end of which is formed with a bleed opening therein that has an interiorly disposed depending edge therearound to provide a liquid baffle and a radially extending gripping flange projecting outwardly from said body portion, said independent float member including a hollow, unitary, tubular float separate from said plug member and arranged to be guidingly seated within said cell for support on and actuation by the buoyant effect of the liquid within said cell, said float member having a hollow, open ended, base portion of a relatively large diameter connected to an elongated, hollow, relatively small diameter, opaque, top portion that is adapted to reciprocate within the transparent plug tubular portion between two extreme limits that visibly indicate the level of liquid within the battery cell, said float member base portion having a flange thereon arranged to seat on a cell supported seat when the liquid level within the cell is at a low position and another portion on the upper end of the float opaque top portion adapted to engage the baffle on the plug tubular portion to cooperate therewith in seating the float member at its upper limit.

2. A two-piece battery case fill plug and liquid level indicator comprising independent plug and float members, said plug member including a cylindrical, hollow body portion adapted to be releasably secured in the cell fill opening, said plug body portion having an upwardly extending, transparent, tubular central tower, the upper end of which is formed with a bleed opening therein and a radially extending gripping flange projecting outwardly from said body portion, said independent float member including a hollow, unitary, tubular float separate from said plug member and arranged to be guidingly seated within said cell for support on and actuation by the buoyant effect of the liquid within said cell, said float member having a hollow, open ended, base portion of a relatively large diameter connected to an elongated, hollow, relatively small diameter, opaque, top portion that is adapted to reciprocate within the transparent plug tubular portion between two extreme limits that visibly indicate the level of liquid within the battery cell, said float member base portion having a flange thereon arranged to seat on a cell supported seat when the liquid level within the cell is at a low position and another portion on the upper end of the float opaque top portion adapted to engage the upper end of the plug tubular portion to cooperate therewith in seating the float member at its upper limit.

References Cited in the file of this patent
UNITED STATES PATENTS

| | | |
|---|---|---|
| 1,491,143 | Kerr | Apr. 22, 1924 |
| 1,703,233 | Hall et al. | Feb. 26, 1929 |
| 2,610,221 | Keller | Sept. 9, 1952 |
| 2,724,360 | Crookshank | Nov. 22, 1955 |

FOREIGN PATENTS

| | | |
|---|---|---|
| 519,643 | Belgium | May 15, 1953 |